Figure 1:
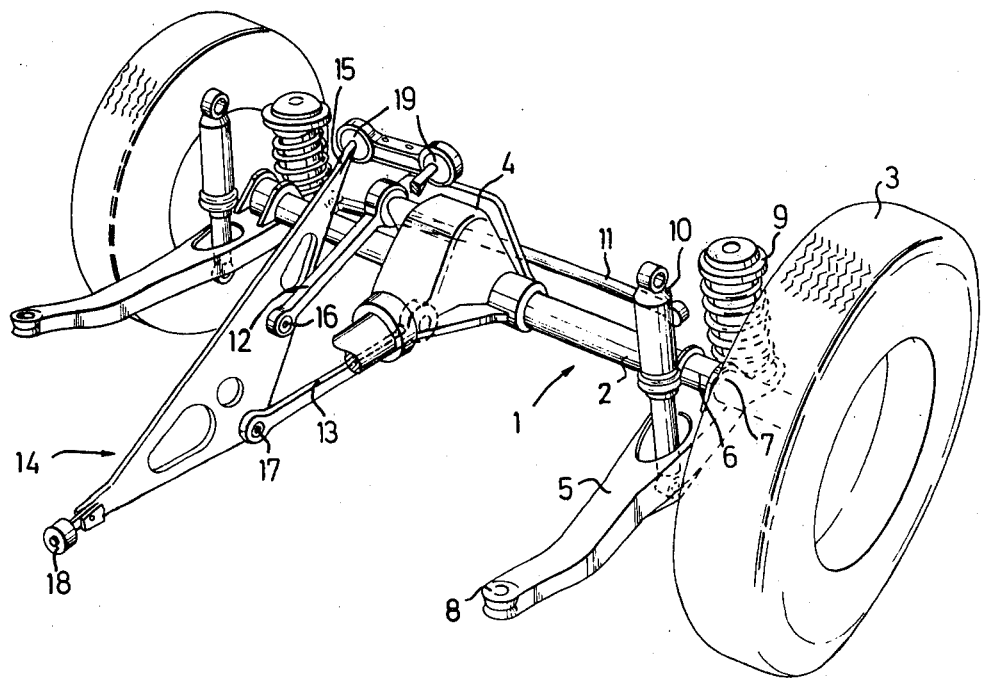

United States Patent [19]

Bergström

[11] 4,334,696
[45] Jun. 15, 1982

[54] REAR WHEEL MOUNTING FOR MOTOR VEHICLES WITH A RIGID REAR AXLE

[75] Inventor: Carl-Ingvar A. Bergström, Västra Frölunda, Sweden

[73] Assignee: AB Volvo, Gothenburg, Sweden

[21] Appl. No.: 156,391

[22] Filed: Jun. 4, 1980

[51] Int. Cl.³ .............................................. B60G 11/14
[52] U.S. Cl. ..................................... 280/725; 280/688
[58] Field of Search ............... 280/685, 686, 688, 718, 280/721, 722, 724, 725, 726

[56] References Cited

U.S. PATENT DOCUMENTS 3,246,718 4/1966 Kozicki ............................... 280/725
3,284,095 11/1966 Allison ................................ 280/721

FOREIGN PATENT DOCUMENTS 1320371 6/1973 United Kingdom ................ 280/724

Primary Examiner—Joseph F. Peters, Jr.
Assistant Examiner—Ross Weaver
Attorney, Agent, or Firm—Young & Thompson

[57] ABSTRACT

A rear wheel mounting for motor vehicles with a rigid rear axle carried on a pair of support arms which are articulated on the body. A pair of torque stays are journalled on the rear axle to transmit driving and braking torque to the body. The torque stays form a pair of stays which cooperate with each other instead of each with an individual support arm, the stays being articulated to a frame which is flexibly attached to the body.

9 Claims, 3 Drawing Figures

REAR WHEEL MOUNTING FOR MOTOR VEHICLES WITH A RIGID REAR AXLE

The present invention relates to a rear wheel mounting for motor vehicles with a rigid rear axle, comprising a pair of longitudinal, spaced support arms which are joined to the axle and are journalled for pivoting vertically relative to the vehicle body, spring and shock absorbing means acting between the respective support arm and the body, and a pair of torque stays acting between the axle and the body and which are arranged to contribute to the transmission of driving and braking torque to the body.

In known rear wheel mountings of this type, the torque stays are coordinated with the support arms so that the respective torque stay and associated support arm transmit together driving and braking torque to the body. The support arms thus have the double function of both localizing the rear axle longitudinally and serving as torque stays. The difficulty in the construction of rear wheel mountings of this type is to achieve both effective control of the axle and effective insulation of noise and vibrations from the motor, which are led via the transmission and propeller shaft to the rear axle. Insufficient insulation results in sound and vibrations being led via the wheel mounting into the body. The reason for this is that it is difficult to achieve an optimization between the insulating function and the localizing function when the same component is to have more than one function, as is the case with the support arms.

The purpose of the present invention is to achieve a rear wheel mounting of the type described in the introduction, which makes it possible to combine effective control of the rear axle with good insulation of noise and vibrations.

This is achieved according to the invention by virtue of the fact that the torque stays form a cooperating pair and are articulated to frame means which are flexibly joined to the body.

By allowing, in accordance with the invention, the two torque stays to cooperate with each other instead of, as previously, each with an individual support arm, the support arms are freed of the torque transmission function. This means that separate elements are used for each function. When the support arms and the anti-roll bar alone control the axle, better localization is achieved. The conducting of noise and vibration is reduced by a torque-absorbing function which is completely separate from the other functions, with double insulation between the rear axle and the body. This is achieved by using the flexibly mounted frame means.

Figure 2:
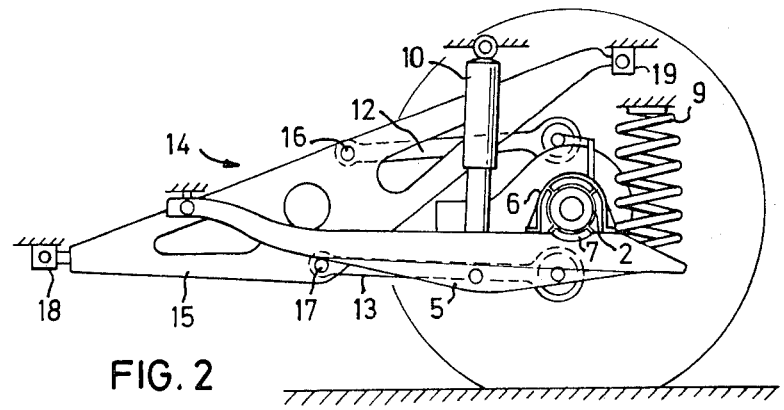
Figure 3:
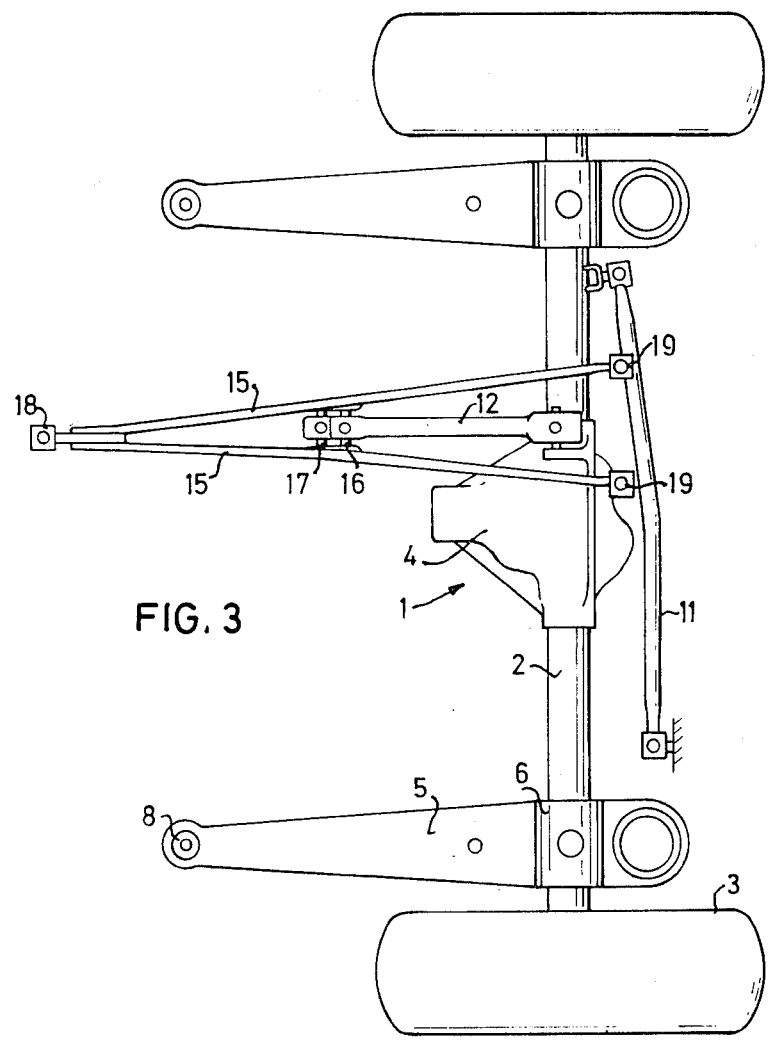

The invention will be described below in more detail with reference to an example shown in the accompanying drawings, in which FIGS. 1, 2 and 3 show a perspective view, side view and top plan view, respectively, of a rear wheel mounting according to the invention.

The rigid rear axle 1 shown is of conventional design and comprises a pair of tubes 2, in which the drive shafts of the wheels 3 are journalled and which are joined to a differential housing 4. The axle tubes 2 are supported by a pair of support arms 5 with the aid of caps 6 and liners 7 of flexible material. The forward ends of the support arms 5 are designed to to be articulated in a conventional manner on the vehicle body and have flexible bearing bushings 8. A spiral spring 9 and a shock absorber 10 are arranged between each support arm 5 and points of attachment on the body. An anti-roll bar 11 extends between flexible points of attachment on the body and rear axle. The support arms 5 localize the rear axle longitudinally, while the anti-roll bar 11 localizes the axle transversely.

Instead of, in the conventional manner, arranging torque stays which are anchored on the rear axle and the body above each support arm, the invention utilizes an upper and a lower torque stay 12, 13, which form a cooperating pair. The rear ends of the torque stays 12,13 are articulated on the rear axle differential housing 4, while the forward ends are journalled in a frame 14. Both the forward and rear journals include flexible bushings. The frame 14 is made of a pair of frame elements 15 arranged in a V-shape, between which elements the torque stays 12,13 are journalled on shafts 16,17. The forward end of the frame 14 lies in front of the forward ends of the support arms 5 and is anchored to the body with the aid of a flexible bushing 18. Its rear end lies just behind the axle 1 and is anchored to the body with the aid of a pair of flexible bushings 19.

In the embodiment described, the support arms 5 and the anti-roll bar 11 alone control the axle 1, which is an advantage for optimization. Driving and braking torque is taken up by the cooperating torque stays 12,13 and is transmitted via the frame 14 to the body. The forces in the torque stays are geared down by virtue of the large base between the introduction points and are transmitted via the flexible bushings 18,19 vertically into rigid portions of the body, resulting in reduced sound conductivity and low body stresses. An instantaneous center which is moved far forward reduces the risk of so-called brake hop and reverse power hop. Finally, the construction according to the invention permits great flexibility as regards building in of other components in the vicinity of the rear axle. For example, the fuel tank can be placed in front of the rear axle on the left side of the differential housing in the embodiment shown in the figures.

What I claim is:

1. In a rear wheel mounting for motor vehicles with a rigid rear axle, comprising a pair of longitudinal, spaced support arms which are joined to the axle and are journalled for pivoting relative to the vehicle body, spring and shock absorbing means acting between the respective support arms and the body, and a pair of torque stays acting between the axle and the body and which are arranged to contribute to the transmission of driving and braking torque to the body; the improvement in which the torque stays form a cooperating pair and are articulated to frame means flexibly joined to the body, the frame means having a forward point of attachment to the body, said point being situated in front of the articulation of the support arms in the body, and a rear point of attachment to the body, said point lying approximately above the rear axle.

2. In a rear wheel mounting for motor vehicles with a rigid rear axle, comprising a pair of longitudinal, spaced support arms which are joined to the axle and are journalled for pivoting relative to the vehicle body, spring and shock absorbing means acting between the respective support arms and the body, and a pair of torque stays acting between the axle and the body and which are arranged to contribute to the transmission of driving and braking torque to the body; the improvement in which the torque stays form a cooperating pair and are articulated to frame means flexibly joined to the body, the frame means being formed of a pair of vertical frame elements arranged in a V-shape as seen in the horizontal plane, and the torque stays being swingably journalled on shafts running between the frame elements.

3. In a rear wheel mounting for motor vehicles with a rigid rear axle, comprising a pair of longitudinal, spaced support arms which are joined to the axle and are journalled for pivoting relative to the vehicle body, spring and shock absorbing means acting between the respective support arms and the body, and a pair of torque stays acting between the axle and the body and which are arranged to contribute to the transmission of driving and braking torque to the body; the improvement in which the torque stays form a cooperating pair and are articulated to frame means flexibly joined to the body at two points which are spaced apart from each other lengthwise of the body.

4. Rear wheel mounting according to claim 3, said stays being articulated to said frame means between said spaced points.

5. Rear wheel mounting according to claim 4, said stays being articulated to said frame means at points which are spaced apart from each other on said frame means.

6. Rear wheel mounting according to claim 5, said points of articulation of said stays on said frame means being disposed one higher than the other, the stay articulated to said higher point being higher than the axle and the stay articulated to said other point being lower than the axle.

7. Rear wheel mounting according to claim 5, in which the points at which the frame means are flexibly joined to the body are spaced apart from each other vertically, the rear point being higher than the forward point.

8. In a rear wheel mounting for motor vehicles with a rigid rear axle, comprising a pair of longitudinal, spaced support arms which are joined to the axle and are journalled for pivoting relative to the vehicle body, spring and shock absorbing means acting between the respective support arms and the body, and a pair of torque stays acting between the axle and the body and which are arranged to contribute to the transmission of driving and braking torque to the body; the improvement in which the torque stays form a cooperating pair and are articulated about spaced horizontal axes to frame means flexibly joined to the body.

9. Rear wheel mounting according to claim 8, said spaced axes being spaced apart from each other vertically.

* * * * *